ORTHOPEDIC SEAT SUPPORT

Original Filed June 20, 1966 2 Sheets-Sheet 1

INVENTOR
Edward Froelich
BY John Howard Forgat
HIS ATTORNEY

INVENTOR
Edward Froelich
BY
HIS ATTORNEY

United States Patent Office

Re. 27,176
Reissued Sept. 21, 1971

27,176
ORTHOPEDIC SEAT SUPPORT

Edward Froelich, 5408 Eastview Park,
Chicago, Ill. 60615

Original No. 3,321,241, dated May 23, 1967, Ser. No. 558,719, June 20, 1966, which is a continuation-in-part of Ser. No. 463,237, June 11, 1965. Application for reissue May 16, 1968, Ser. No. 731,362
Int. Cl. A47c *3/00*
U.S. Cl. 297—284 4 Claims

Matter enclosed in heavy brackets [ ] appears in the original patent but forms no part of this reissue specification; matter printed in italics indicates the additions made by reissue.

*ABSTRACT OF THE DISCLOSURE*

*Seat back with vertically adjustable contoured orthopedic element or device. The back comprises an inner core with an outer cover therefor, a fabric portion being intermediate cover and core and secured to the cover by spaced parallel stitching to form a pocket to accommodate the orthopedic element. Provision is made by means attached to the orthopedic element and extending through an aperture provided in the outer cover for vertically adjusting the orthopedic device to a desired position and removably securing the same in such position.*

My application for patent is a continuation-in-part of my copending application Ser. No. 463,237 filed June 11, 1965, and entitled. "Orthopedic Seat Support," now abandoned, and the invention, relating generally to chairs, automobile seats, upholstered benches and the like, more particularly concerns the production of such seats with included back and back rest or orthopedic device closely adjustable in ready, positive and nice conformity to the orthopedic requirements of the individual user.

(I sometimes designate the backs of seats, chairs, etc., as seat backs. And by this term as herein employed, I refer to that portion of a vehicular, office, household or other type of chair, lounge, sofa or the like, which supports the back of the person seated thereon. More simply, this is the back of a chair or the like. While for convenience of reference I sometimes employ the term "chair," I use this term in its generic sense, and thereby encompass any seating facility of the general type described.)

One of the objects of my invention is to provide a seat back in which a related orthopedic back rest is limited to adjustment along the longitudinal extent of the seat back, being effectively restrained against lateral movement durnig the course of its longitudinal travel, all in simple, direct, inexpensive and highly effective manner.

Another object is to provide the combination of a seat back of the type described, together with an included orthopedic back rest adjustable along the longitudinal extent of the seat back, and capable of being made positively yet removably fast in any adjustable position thereof.

A further object is to provide an expeditious method, requiring a minimum number of manipulative steps, for effectively adapting a seat back in simple and direct manner to conform closely to the back support requirements of the individual user.

A still further object is the provision of an orthopedic back rest of simple, inexpensive and effective construction which is well adapted to service under the varying conditions of actual practical use.

Other objects and advantages in part will be obvious and in part pointed out during the course of the following description, particularly when considered in the light of the accompanying drawings.

Accordingly, my invention may be considered as comprising an orthopedic back rest for chairs, automobile seats, upholstered benches and the like, including an exterior portion having upper and lower openings therein, an interior portion contiguous thereof with longitudinally extending spaced parallel rows of stitching securing the two and providing a pocket therebetween, and a rigid and contoured orthopedic device disposed within the pocket and having upper and lower strap means respectively extending through the upper and lower openings and securing the orthopedic device precisely, positively and removably fast in selected adjustment vertically within the pocket.

In the several views of the drawings wherein I disclose that embodiment of my invention which I presently prefer:

In FIG. 1 my new seat back is disclosed in front elevation;

Figure 4:
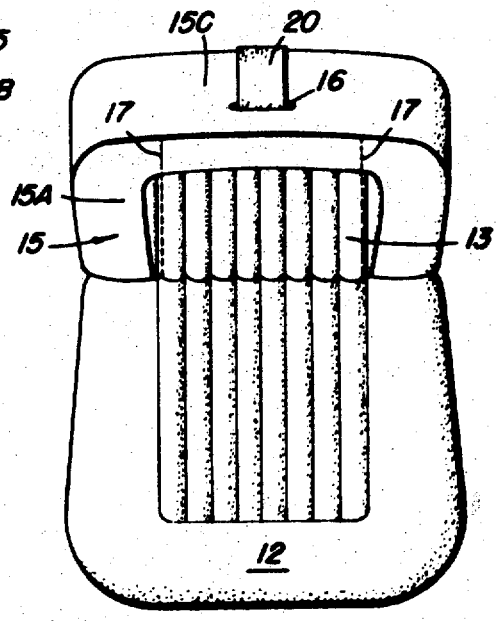

FIG. 4 discloses my seat back in top plan view; while

Figure 7:
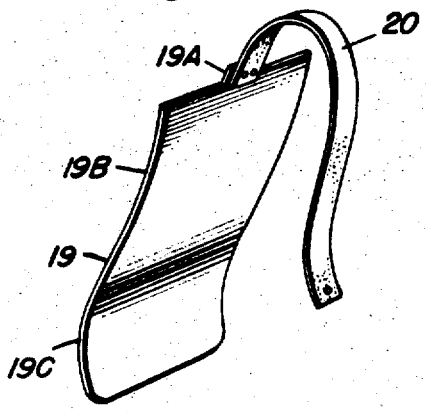
Figure 5:
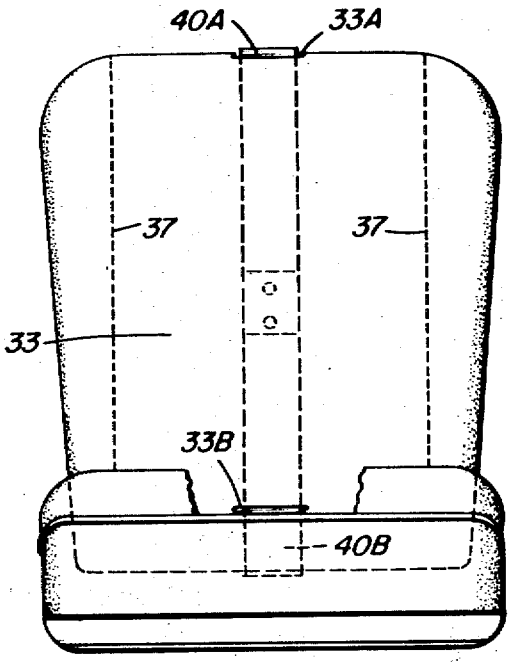
Figure 6:
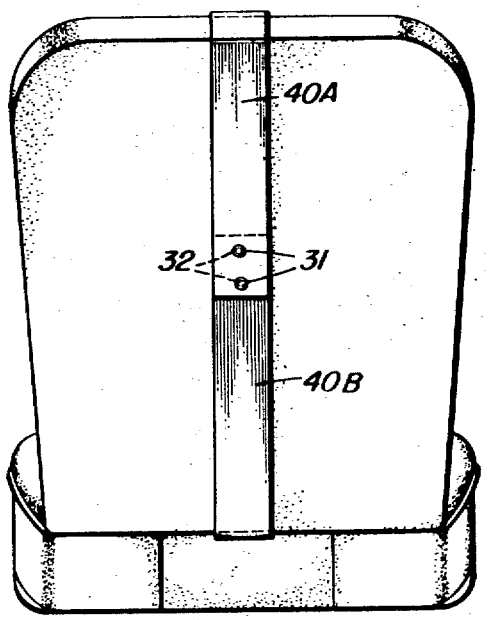
Figure 8:
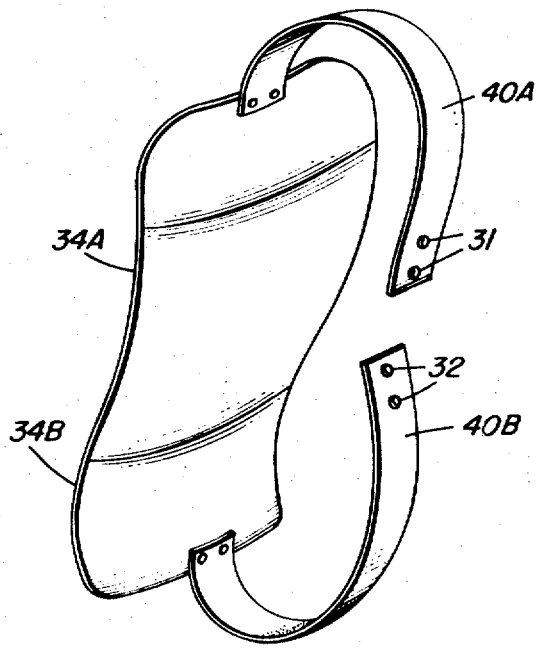

FIGS. 5 and 6, respectively, are front elevations and back elevations of a second embodiment of the seat back according to my invention; and FIGS. 7 and 8, respectively, are the orthopedic back rest and a further embodiment of the same in accordance with the invention.

Throughout the several views of the drawings, like reference characters denote like structural parts or details.

To permit a more ready and thorough understanding of my invention, it may be noted at this stage of the disclosure that it has long been recognized that prolonged sitting in a chair, sofa, or the like is frequently attended by discomfort in the region of the back of the person using the seat. This is true both at office and at home. And rapid tiring is frequently encountered in moving vehicles, such as automobiles, buses, trucks and the like.

The localized region of discomfort thus developed not only varies from person to person, perhaps in dependence upon his physical structure, but as well and at least to a certain extent, upon the configuration, construction and upholstery of the particular seat. Thus a feeling of strain may develop in the thoracic region of some users, in the lumbar region of others, and in the sacral region of still other persons.

Many efforts have been directed, over a period of years, to a solution of the general problem noted. No one proposal, however, appears to have been completely successful. Some proposals fail to provide requisite adjustability so that, at best, the seat thus produced will be suited for but one user. Other proposals have been too complicated, involving fragility, relatively short useful life, uncertainty in operation, unsightliness in appearance, high production costs, or any combination of one or more of the foregoing disadvantages. Other proposed constructions require special shaping and construction of the seat back while failing to provide requisite certainty that the orthopedic device will be retained in a particular adjusted position.

For one reason or another, known and available proposals have proved impracticable. Consequently, they have been virtually rejected as concerns commercial acceptance and exploitation.

An object of my invention, therefore, is to avoid in substantial measure the many defects and disadvantages hereinbefore recited and in so doing, to provide a simple, practical, efficient and effective seat back and orthopedic back rest, particularly an automobile seat back and back rest which, pleasing in apperance, involves but limited material departure from conventional construction and at the same time permits ready and nice adjustment, in direct and effective manner, to closely satisfy the back support requirements of each individual user and this, however long be his occupancy of the chair, seat or the like.

In one aspect my invention may be considered as providing a seat back for reception of an orthopedic device. In another aspect, it provides the combination of a seat back and related orthopedic device longitudinally adjustable with the respect thereto and restrained against lateral movement relative to the seat back. In a third it relates to the orthopedic back rest per se and to such rest and fastening strap or the like as employed in the back rest combination. Considered further, it includes a method of adapting a seat back for orthopedic adjustment relative to the back support requirements of the individual user.

Figure 1:
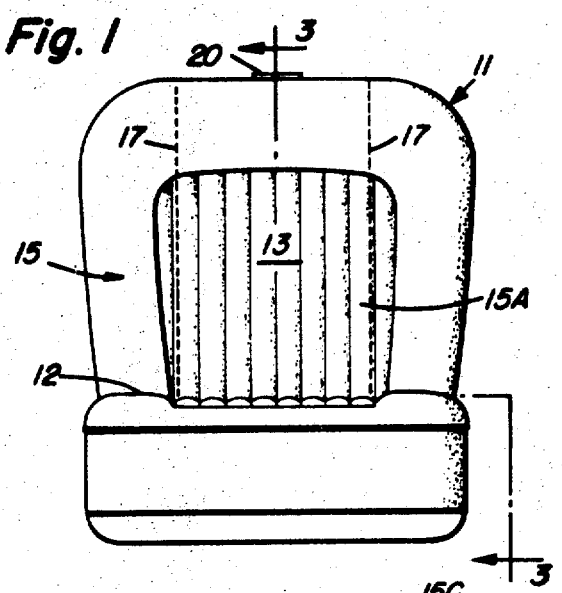

Having reference to the several views of the drawings therein the seat of a conventional automobile, employed by way of typical illustration, is indicated generally at 11 in FIG. 1, here illustratively disclosed as the buckle type of seat, a type of seat which is much in use at the present time. This seat 11 comprises a seat cushion 12 and seat back cushion or seat back 13.

Figure 2:
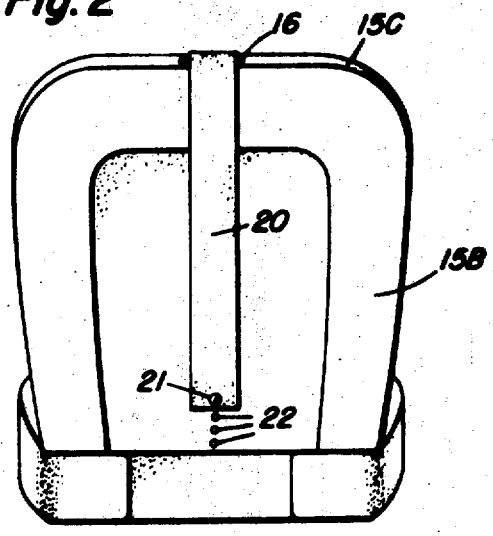
FIG. 2 is a rear elevation of the seat back according to FIG. 1 indicating one form of fastening.
Figure 3:
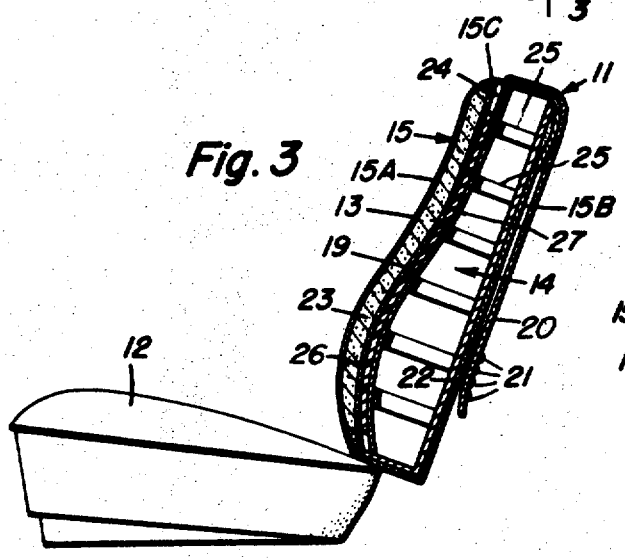
FIG. 3 is a transverse section taken on line 3—3 of FIG. 1 and indicating a modified form of fastening.

As best illustrated in the sectional view of FIG. 3, my seat back is essentially comprised of a central core 14, upholstery padding 23 surrounding core 14 having springs 25 and an outer upholstery cover 15, all conventional in the art. The front of this cover 15 is indicated at 15A in FIG. 1, while the rear 15B therefore is disclosed in FIG. 2. On the back surface of front cover 15A I provide a sharply defined pocket or pouch 24 (FIG. 3). This lies between central core 14 and upholstery padding 23, such pocket extending longitudinally along the vertical length of seat back 13. This I accomplish by sewing or stitching a fabric 26 or other backing by way of spaced parallel seams 17, 17 onto the seat back 27 (FIG. 1). This backing portion extends from a line near the top of cover front 15A to or just short of the bottom of seat back 13. The width of the pocket or pouch 24 preferably is about that of a person's back. Where desired, pocket or pouch 24 may be formed by stitching an upholstery portion on the face or front surface of seat back 13 instead of on the obverse side.

Pocket or pouch 24 is nicely adapted to receive a shaped orthopedic device 19 (FIGS. 3 and 7) for ready and positive adjustment along the longitudinal, vertical extent of seat back 13 (see FIG. 3).

The orthopedic device or back rest 19 according to my invention is both rigid and contoured and (see FIG. 7) comprises an upper inwardly moving portion 19B, as one faces the same, and lower outwardly moving portion 19C about two-thirds the way down from the top. The contoured back rest preferably is fashioned of moulded plastic, hard rubber, sheet steel, wood or the like. It is necessary, I find, that the back rest be rigid and that it be contoured to the back of the average user. The height of the rest from top to bottom, as measured over the contoured surface is about 19 inches for best results.

A strap 20 secured to the tab 19A provided at the top of orthopedic device 19 permits the latter to be readily and quickly raised or lowered in the pocket 24 to accommodate closely to the requirements of the particular individual who may be occupying seat 11. A feature of my invention is that lateral or sidewise motion of the orthopedic device 19 in pocket 24 is effectively inhibited by the seams 17, 17. These seams serve as guides facilitating longitudinal movement of the orthopedic device within the pocket containing the device.

Strap 20, attached to the top of tab 19A, is accommodated by transverse slit 16 in the top 15C of cover 15 (see FIGS. 1 and 4). This strap extends rearwardly across the top of seat back 13 and downwardly along the rear of 15B of back cover 15 (see FIG. 2). On either the strap 20, near the free end thereof, or on the corresponding portion of the back 15B of cover 15, I provide a plurality of like fastening means. Illustratively, as shown in FIG. 3, I provide the plurality of fastening elements on strap 20 in the form of snaps 21, illustratively four in number, equally spaced with respect to each other along the length of strap 20, say with ½-inch spacing on centers.

On the corresponding element of strap 20 and back 15B, I provide a single complementing fastening means, illustratively the single fastening stud 22 on the back 15B in FIG. 2. This conveniently is disposed centrally as considered with respect to the transverse dimensions of this back 15B.

Where desired, resort can be had, within the concept of my invention, to any symmetrical reversal of the fastening devices. Illustratively, a plurality of studs 22 may be provided along the longitudinal center line of the back 15B of the seat (FIG. 2). And in such instance, I provide strap 20 with but a single snap 21.

Regardless of the particular fastening arrangement, it is at once evident that the orthopedic device can be quickly and positively made removably fast in nice adjustment to the comfort requirements of each person. Readjustment is rapid and certain to suit the requirements of the individual user. The back support is effectively constrained against slippage sideways, and to longitudinal linear movement. And this, with the use of but a single strap 20.

Effective, rapid and certain in operation, my new seat back is characterized by simplicity of construction. This of course reduces production costs, both in time and materials. The paired vertical seams defining the pocket or pouch 24 not only restrain the orthopedic device 19 against sidewise or lateral movement but, as has already been fully developed hereinbefore, effectively serve as a guideway for the orthopedic device during the course of its up and down travel.

No special construction of the seat back is required, in the sense true of certain prior art constructions, with its attendant increase in cost. Rather, effective reliance is had, in the otherwise conventional seat, upon the stitching or other mode of paired spaced parallel seams 17, 17, to define the pocket 24 and to provide guide means for the orthopedic device 19.

By virtue of my new construction a single strap 20 serves effectively as a locking device for positively making the latter removably fast in any adjusted position, in sharp distinction from certain prior art proposals wherein, a plurality of straps being provided, reliance nevertheless must perforce be had to friction for securing the orthopedic device in its adjustment; such construction to that extent being relatively unstable.

A further embodiment of my invention is illustrated in FIGS. 5 and 6 of the accompanying drawings. Therein I show a somewhat more simplified and less costly construction wherein upper and lower horizontal slots 33A and 33B are provided respectively in the top and bottom portions of the upholstered back 33. The modified form of rigid, contoured orthopedic back rest of my invention (see FIG. 8) is contoured in the form of an upper concave portion 34A and a lower substantially convex portion 34B, the latter commencing about two-thirds the way down from the top. The back rest is positioned within a pocket provided in the front of the seat back, this pocket being defined by parallel stitching 37, 37 as seen in FIG. 5. Upper and lower straps 40A and 40B respectively (see FIGS. 6 and 8), appropriately secured to the rigid contoured orthopedic back rest, pass through the respective upper and lower slots 33A and 33B of back 33. These straps overlap one another, as seen in FIG. 6 and are secured together as by snaps 31, 32.

Where desired I fashion straps 40A and 40B of a special pile fabric provided with interlocking pile tentacles which makes for a simple and convenient fastening.

Where wide straps are employed at top and bottom my rigid and contoured orthopedic back rest may be used outside of and contiguous the front surface of the seat back itself, the straps passing through in-and-out slots provided at top and bottom of the seat back or through strap holders sewed or otherwise secured to top and bottom of the seat back. For best results, however, and minimum side-play of the orthopedic back the constructions described above are employed.

It is apparent from the foregoing that my new construction effectively combines minimal alteration of the initial chair, vehicle seat or the like with attendant simplicity and ease of production, providing positive positioning and guiding of the orthopedic device in ready longitudinal adjustments, while fully resisting lateral displacement. My new seat back and rigid contoured orthopedic device or back rest, sturdy and of long, useful life, can thus be readily and simply moved to any one of such variety of adjustments as to permit virtually complete accommodation to the requirements of the occupant of the seat.

All these, as well as many other highly practical advantages attend the practice of my invention.

Since the foregoing disclosure is but illustrative of the basic concept of my invention, it will be understood that changes and variations may be made in the embodiments described herein without departing from my invention as set forth in the claims at the end of this specification.

Having described my invention, I claim:

1. A seat back comprising an inner central core and exterior upholstery cover surrounding said central core with an opening provided transversely of said seat back in the region of the top thereof; an interior fabric portion between upholstery and core; paired, spaced and longitudinally extending rows of stitching provided vertically along the front face of said seat back and securing together the upholstery cover and the fabric portion in such manner as to define an interior pocket therebetween; a rigid and contoured orthopedic device disposed in vertically adjustable manner within said pocket, said paired rows of stitching combining to provide a vertical guide for said orthopedic device, constraining the latter against lateral displacement whereby the orthopedic device is adjustable in a vertical and longitudinal direction only to accommodate to the individual requirements and comfort of each user; a single strap extending through said transverse opening and attached to said orthopedic device centrally of its lateral extent; a plurality of securing means disposed along the length of a selected one of said strap and the back of said seat; and a single cooperating securing means disposed on the other one of said strap and the back of said seat, the said several securing means cooperating to make the orthopedic device precisely, positively and removably fast in selected adjustment vertically within said pocket.

2. A seat back comprising an inner central core and exterior upholstery cover surrounding said central core with upper and lower openings being provided transversely of said seat back in the regions of the top and bottom thereof; an interior fabric portion between upholstery and core; paired, spaced and longitudinally extending rows of stitching provided vertically along the front face of said seat back and securing together the upholstery cover and the fabric portion in such manner as to define an interior pocket therebetween; a rigid and contoured orthopedic device disposed in vertically adjustable manner within said pocket, said paired rows of stitching combining to provide a vertical guide for said orthopedic device, constraining the latter against lateral displacement whereby the orthopedic device is adjustable in a vertical and longitudinal direction only to accommodate to the individual requirements and comfort of each user; upper and lower straps respectively extending through said upper and lower transverse openings and attached to said orthopedic device centrally of its lateral extent; and means securing said strap together to make the orthopedic device precisely, positively and removably fast in selected adjustment vertically within said pocket.

3. A seat back comprising an inner core portion; an exterior portion with upper and lower openings provided in the region of top and bottom thereof; an interior portion between inner core and exterior portion; paired, spaced and longitudinally extending means securing together said exterior and interior portions in such manner as to define a pocket therebetween; a rigid and contoured orthopedic device disposed in vertical adjustable manner within said pocket, said paired means combining to provide a vertical guide for said orthopedic device, constraining the latter against lateral displacement whereby the orthopedic device is adjustable in a vertical and longitudinal direction to accommodate to the individual requirements and comfort of each user; upper and lower strap means respectively extending through said upper and lower openings and attached to said orthopedic device; and means securing the same to make the orthopedic device precisely, positively and removably fast in selected adjustment vertically within said pocket.

*4. A seat back comprising an inner core portion; an exterior cover portion therefor with at least one opening therein; an interior fabric portion between inner core and exterior cover portion; paired, spaced and longitudinally extending stitching means securing together said exterior cover portion and interior fabric portion in such manner as to define a pocket therebetween; a rigid and contoured orthopedic device disposed in vertical adjustable manner within said pocket, said paired stitching means combining to provide a vertical guide for said orthopedic device, constraining the latter against lateral displacement whereby the orthopedic device is adjustable in a vertical and longitudinal direction to accommodate to the individual requirements and comfort of each user; means extending through said opening and attached to said orthopedic device; and means securing the said last-mentioned means to said back to make the orthopedic device precisely, positively and removably fast in selected adjustment vertically within said pocket.*

References Cited

The following references, cited by the Examiner, are of record in the patented file of this patent or the original patent.

UNITED STATES PATENTS

| | | | |
|---|---|---|---|
| 2,591,306 | 4/1952 | Sherman | 297—284 |
| 3,086,817 | 4/1963 | Wilfert | 297—284 |
| 3,110,042 | 11/1963 | Slemmons | 5—345 |
| 3,195,953 | 7/1965 | Zacks | 297—410 |
| 3,321,241 | 5/1967 | Froelich | 297—284 |

FOREIGN PATENTS

| | | | |
|---|---|---|---|
| 22,196 | 9/1929 | Australia | 297—230 |
| 487,420 | 6/1938 | Great Britain | 297—284 |
| 526,511 | 12/1927 | Italy | 297—231 |

BOBBY R. GAY, Primary Examiner

G. O. FINCH, Assistant Examiner